(12) United States Patent
Bertoldi et al.

(10) Patent No.: US 7,563,994 B2
(45) Date of Patent: Jul. 21, 2009

(54) ELECTRONIC SCALE WITH DISPLAY DISABLEMENT

(75) Inventors: Jean-Claude Bertoldi, Goettingen (DE); Klaus Fuelscher, Goettingen (DE); Rainer Kirchhoff, Hattorf (DE); Swen Weitemeier, Loedingsen (DE)

(73) Assignee: Sartorius AG, Goettingen (DE)

( * ) Notice: Subject to any disclaimer, the term of this patent is extended or adjusted under 35 U.S.C. 154(b) by 0 days.

(21) Appl. No.: 12/134,819

(22) Filed: Jun. 6, 2008

(65) Prior Publication Data
US 2008/0236901 A1    Oct. 2, 2008

Related U.S. Application Data

(63) Continuation of application No. PCT/EP2006/011159, filed on Nov. 22, 2006.

(30) Foreign Application Priority Data

Dec. 9, 2005    (DE) .................... 10 2005 058 851

(51) Int. Cl.
*G01G 19/00* (2006.01)
(52) U.S. Cl. .................. 177/25.13; 177/124; 177/177
(58) Field of Classification Search ........... 177/25.13, 177/124, 177
See application file for complete search history.

(56) References Cited

U.S. PATENT DOCUMENTS

| 3,826,319 | A | * | 7/1974 | Loshbough | ............ 177/25.15 |
| 3,978,457 | A | * | 8/1976 | Check et al. | ............ 705/402 |
| 4,586,575 | A | * | 5/1986 | Muerdter et al. | ............ 177/124 |
| 4,688,898 | A | | 8/1987 | Oldendorf et al. | |
| 5,056,040 | A | | 10/1991 | Melcher et al. | |
| 6,037,548 | A | * | 3/2000 | Baitz et al. | ............ 177/25.13 |
| 6,373,237 | B1 | | 4/2002 | Oldendorf et al. | |
| 6,858,808 | B1 | | 2/2005 | Buehler et al. | |
| 7,361,867 | B2 | | 4/2008 | Von Steuben et al. | |

FOREIGN PATENT DOCUMENTS

| DE | 40 06 375 A1 | 9/1991 |
| DE | 44 24 826 A1 | 2/1995 |
| WO | 01/88492 A | 11/2001 |

* cited by examiner

*Primary Examiner*—Randy W Gibson
(74) *Attorney, Agent, or Firm*—Sughrue Mion, PLLC

(57) ABSTRACT

An electronic scale (1) with a display unit (9), at least one control button (11 ... 14), a digital signal processing unit (5) and a digital interface (7) to a higher-level electronic data processing (EDP) system (15). The digital signal processing unit (5) has an activatable switch or program part for locking the scale. This switch or part releases the display of the weighing result only for as long as the higher-level EDP system (15) communicates with the scale (1) and locks the display at other times. The activation of the switch or part for the locking process is stored in a power-failure-proof memory (21).

18 Claims, 2 Drawing Sheets

ELECTRONIC SCALE WITH DISPLAY DISABLEMENT

This is a Continuation of International Application PCT/EP2006/011159, with an international filing date of Nov. 22, 2006, which was published under PCT Article 21(2) in German, and the disclosure of which is incorporated into this application by reference. This application claims priority and benefit of German patent application 10 2005 058 851.4, filed Dec. 9, 2005. The disclosure of this application is also incorporated herein in its entirety.

FIELD AND BACKGROUND OF THE INVENTION

The invention relates to an electronic scale having a display unit, at least one control button, a digital signal processing unit and a digital interface to a higher-level electronic data processing (EDP) system.

Scales of this type are generally known and are described, for example, in German Laid Open Publication DE 44 24 826 A1.

Scales of this type are used, for instance, to prepare mixtures of separate components based on defined formulas. The mixing of paint with certain shades from a few primary pigments is one such application.

OBJECTS OF THE INVENTION

Because both the scales and the required components must be easily accessible for an efficient workflow, the risk of unauthorized use or even theft is high.

It is therefore an object of the invention to provide scales of the above-described type, which make unauthorized use and/or theft significantly more difficult and therefore unattractive.

SUMMARY OF THE INVENTION

According to one formulation of the invention, the signal processing unit of the scale has an activatable switch or program part for locking, which enables the display of the weighing result only as long as the higher-level EDP system communicates with the scale but locks it for the remainder of the time. The activation of the switch or program part for locking is stored in a power-failure-proof memory.

In the activated state of the switch or program part for locking, the scale can be used only as long as the higher-level EDP system is in active data communication with the scale. While the user of the scale is processing mixing orders from the EDP system, the scale can therefore be used normally. Once the mixing orders have been processed, the higher-level EDP system terminates the data communication and the scale automatically changes to its locked state. The scale also changes to the locked state if the connection to the higher-level EDP system is interrupted. The power-failure-proof storage of the activation of the switch or program part for locking ensures that the scale remains in its locked state also after an interruption of the power supply if it was locked before the interruption of the power supply. As a result of this measure, the scale is unusable during work breaks as well as in case of theft.

In one advantageous embodiment, the display of the scale has a lock symbol—in the form of a padlock or a key, for example—which is enabled when the switch or program part for locking is activated. This shows the user of the scale that the scale is not malfunctioning but is deliberately locked. It also indicates to anyone who sees the device that stealing the device would be useless.

The activated state of the switch or program part for locking is preferably stored in a power-failure-proof manner in an EEPROM. This EEPROM can be provided as part of a microprocessor.

Protecting the scale against unauthorized use and/or theft is of course particularly effective if it is practically impossible for non-specialists to deactivate the switch or program part for locking. Advantageously, it is therefore provided that the switch or program part for locking can be deactivated only by entering a password using the control buttons of the scale or by a special signal from the higher-level EDP system.

According to another preferred embodiment, the switch or program part for locking disables not only the display of the weighing result but also the output of the weighing result via the digital interface. Using the disabled scale is therefore impossible even if there is a second display or a printer to print out the measured values.

BRIEF DESCRIPTION OF THE DRAWINGS

The invention will now be described with reference to a concrete embodiment depicted in the figures, in which.

DETAILED DESCRIPTION OF THE PREFERRED EMBODIMENTS

Figure 1:
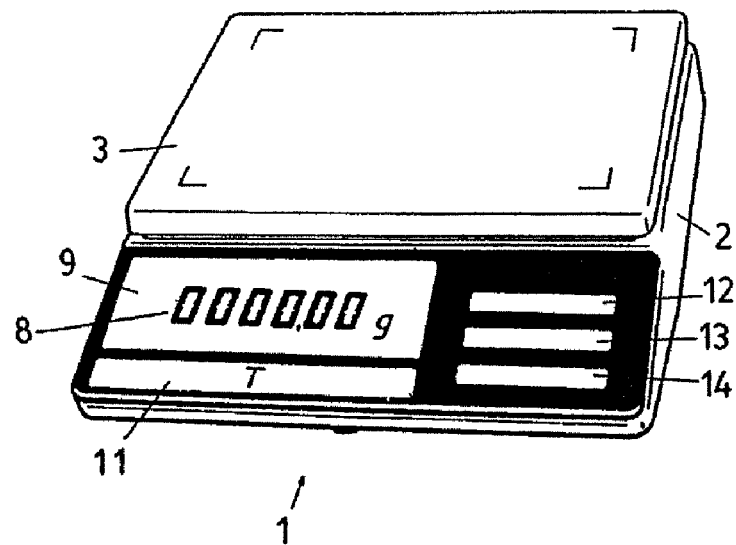
FIG. 1 shows the scale in its normal state.

FIG. 1 shows a scale 1 with a housing 2, a weighing tray 3, a display unit 9 and control buttons 11 . . . 14. In FIG. 1 the display unit 9 displays the weighing result 8 when the weighing tray is empty, i.e., 0000.00 g. The control button 11 is used to tare (=set to zero) the display for the weighing result. The control buttons 12 . . . 14 are used for various purposes depending on the application—for example, to control a printer, acknowledge completion of the dosing of a component, etc.—and are therefore labeled according to the application (they are shown without labels in FIG. 1). The number of control buttons can be less (or more) than the number shown. The scale depicted in FIG. 1 also has a digital interface, which is on the rear side of the scale and therefore not visible in FIG. 1. This interface is often referred to as a data output, although, preferably, it is not only used to transmit data from the scale, for example, to an EDP system connected to the scale, but also to transmit data and/or commands in the other direction, i.e., from the connected EDP system to the scale.

Figure 2:
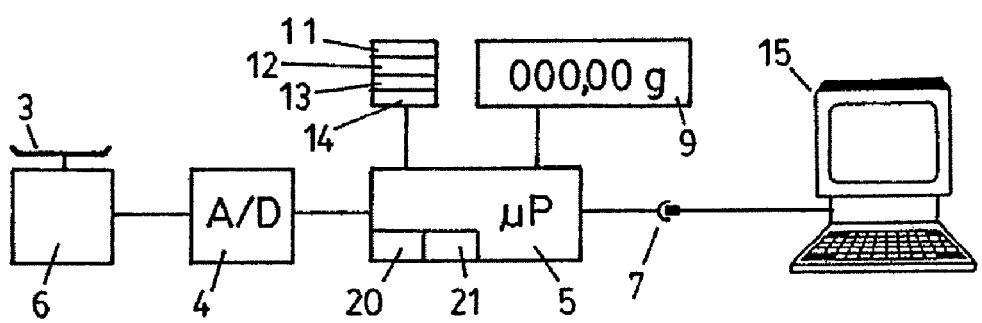
FIG. 2 shows a block diagram of the scale.

A block diagram of the scale is shown in FIG. 2. The weighing system 6 is indicated only schematically. In the example depicted, it supplies an analog output signal, which is digitized by an analog-to-digital converter 4 and supplied as a digital signal to a digital signal processing unit 5. The digital signal processing unit 5 controls the display unit 9 and the digital interface 7 and also prompts the actuation of the control buttons 11 . . . 14. The digital signal processing unit 5 is preferably embodied in a microprocessor, although other processing arrangements can be alternatively or additionally employed. The mechanical and electrical construction of the parts of the scale as described above is generally known and is therefore described only generally. Representative references disclosing such construction details include U.S. Pat.

No. 7,361,867 B2, U.S. Pat. No. 6,373,237 B1, U.S. Pat. No. 5,056,040, U.S. Pat. No. 4,688,898, and DE 44 24 826 A1, each of which is incorporated, in full, herein by reference.

Figure 3:
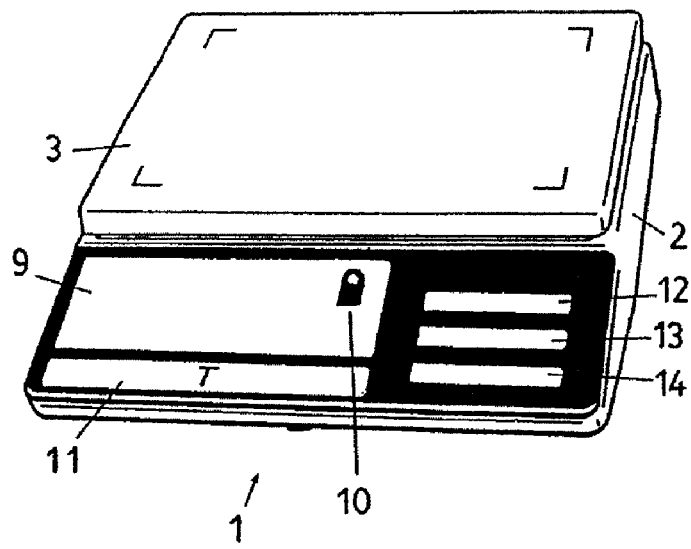
FIG. 3 shows the scale in its locked state.

The scale according to an embodiment has a switch or a program part for locking 20, which disables the display of the weighing result 8 on the display unit 9 (described in greater detail below). The state of whether the switch or program part for locking is enabled or disabled is stored in a power-failure-proof memory 21—an EEPROM, for example. FIG. 1 shows the scale in its unlocked state. FIG. 3 shows the scale in its locked state: the display unit 9 displays no weighing result but rather a lock symbol 10, which in FIG. 3 takes the form of a padlock but can also take the form, e.g., of a key. At the same time the weighing result that is otherwise output via the data interface is also disabled.

Figure 4:
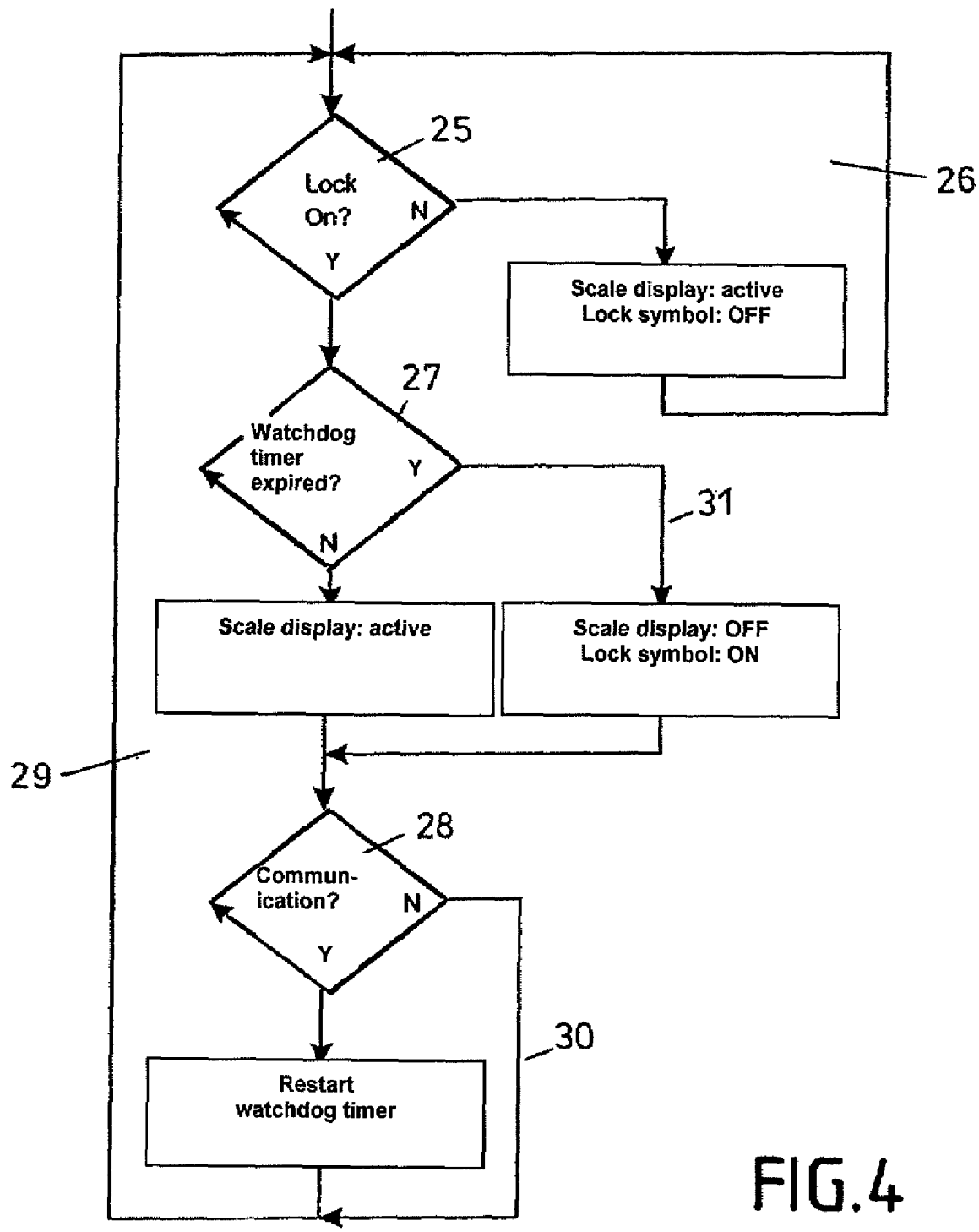
FIG. 4 shows a flow diagram to illustrate the program part for locking.

The details of a mode of operation of a program part for locking 20, according to an exemplary embodiment, are shown in the flow diagram depicted in FIG. 4. In a first decision step (reference numeral 25), the system checks whether the lock is enabled or disabled in the power-failure-proof memory 21. If the lock is disabled, the scale display is active-—t displays the weighing result—and the lock symbol 10 is OFF. The weighing result output via the digital interface is also active. The scale remains in this state continuously (loop 26). Thus the scale behaves like a conventional scale in displaying the weighing result.

If, however, it is established in the first decision step that the lock is activated, the system checks in a second decision step 27 whether a watchdog timer (see below) has expired. If the watchdog timer has not expired yet, the display of the weighing result and the output via the data interface remain enabled and the lock symbol 10 remains OFF. If it is established in the third decision step 28 that the higher-level EDP system is communicating with the scale via the digital interface, the watchdog timer is restarted and the program returns to the first decision step 25. The scale therefore remains in this loop 29 as long as the higher-level EDP system continues to communicate with the scale. For the user of the scale, the scale again behaves like a normal scale in displaying the weighing result even though the lock is activated.

Only when the higher-level EDP system no longer communicates with the scale does the system take the secondary path 30. As a result, the watchdog timer is no longer restarted, so that after elapse of the watchdog timer's "grace period," the secondary path 31 is selected in the second decision step 27, the display of the weighing result on the display unit 9 and the output via the interface 7 are locked and the lock symbol 10 is enabled. In this case the secondary paths 31 and 30 are taken in loop 29, and the scale remains inaccessible to the user. The scale cannot be released from this locked state by disconnecting the communications link with the higher-level EDP system or by disconnecting the power. After reconnecting the power, the scale starts with the first decision step 25 and establishes that the lock is activated. In the second decision step 27 it determines that the watchdog timer has expired and therefore selects the secondary path 31, disables the display of the weighing result and the output via the interface 7 and activates the lock symbol 10. When there is an attempt to use the scale wrongfully and there is no communication with the higher-level EDP system with the correct data protocol, the scale remains in its locked state.

If, on the other hand, there is a power failure when the scale is used as intended, the scale again switches to the locked state of the display by selecting the secondary path 31 when the power is restored. However, at the latest by the time the higher-level EDP system is powered up again and communicates with the scale through the digital interface, which is established at decision step 28, the secondary path 30 is no longer used, the watchdog timer is started and in the next pass through the loop 29 the direct path is again selected at decision step 27 and the display of the weighing result is enabled. Consequently, in this case, too, the scale behaves like a normal scale in displaying the weighing result when the lock is activated. To ensure that on the first pass of loop 29, when the display and generally also the weighing result output via the digital interface are disabled, the higher-level EDP system can recognize that the scale is still disabled, a "scale locked" signal is preferably returned to the EDP system in the locked state. The EDP system can therefore distinguish a momentarily still active lock of the scale from possible errors in the communication with the scale.

In summary, the scale, when used as intended, behaves like a normal scale in displaying the weighing result despite the activated lock. The scale shows that it is disabled and locks the display of the weighing result and the output via interface 7 only when there is an attempt to use it without communication with the higher-level EDP system. This lock cannot be bypassed by simple methods.

The described security concept preferably prevents an easy reversal of the activation of the lock stored in the memory 21 through the setup menu. The lock on the scale can advantageously be deactivated only by entering a password. Entering a password preferably entails operating the control buttons 11 . . . 14 in a predefined sequence and a predefined number of operations. Any other security measures can be used with password identification, such as, for example, aborting the identification process if the password is entered incorrectly three times. Similarly, the deactivation of the lock via the interface to the higher-level EDP system can be made dependent on the use of a special deactivation signal by the EDP system. Generating this deactivation signal can in addition be password-protected in the EDP system.

The person skilled in the art can easily define and supplement the technical details of the locking program described with reference to FIG. 4—such as defining the length of the watchdog timer in coordination with the programming of the higher-level EDP system or delaying the loops 26 and 29, so that there is only one pass per minute, for example. The same applies to integrating this locking program into the rest of the program of the digital signal processing unit.

The invention has been described above with reference to a single exemplary embodiment. However, other embodiments will be apparent to those skilled in the art and are encompassed by the claimed invention. For example, the lock and power-failure-proof storage can not only be implemented by corresponding programs—of a microprocessor, for example—but also by corresponding hardware solutions. For instance, a bistable, electrically actuatable switch is suitable as a power-failure-proof storage element.

There are also additional embodiments to control the lock symbol 10. If the switch or program part for locking is activated, the lock symbol 10 can be activated together with the weighing result display when the program goes through loop 29 in FIG. 4 via the direct path—i.e., when the watchdog timer has not expired and communication with the higher-level EDP system is active. This signals to the user of the scale that the switch or program part for locking is activated but the display is enabled because of the ongoing communication with the higher-level EDP system. In a third embodiment, when the program passes through the secondary path 31 in FIG. 4, the lock symbol 10 blinks to draw special attention to the lock.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

What is claimed is:

1. An electronic scale comprising:
   a display unit configured to display a weighing result;
   at least one control button;
   a digital signal processing unit;
   a digital interface to a higher-level electronic data processing system,
   wherein the digital signal processing unit comprises an activatable switch or program part that enables display of the weighing result when the higher-level electronic data processing system communicates with the scale and disables the display when the higher-level electronic data processing system does not communicate with the scale; and
      a power-failure-proof memory storing an activation component of the switch or program part.

2. The electronic scale as claimed in claim 1, wherein the display unit displays a lock symbol when the switch or program part is activated for locking the display.

3. The electronic scale as claimed in claim 2, wherein the lock symbol depicts a padlock.

4. The electronic scale as claimed in claim 2, wherein the lock symbol depicts a key.

5. The electronic scale as claimed in claim 1, wherein the power-failure-proof memory comprises an EEPROM.

6. The electronic scale as claimed in claim 5, wherein the EEPROM is a component of a microprocessor.

7. The electronic scale as claimed in claim 1, further comprising at least a second control button, wherein the switch or program part enables the display only after a password is entered via the control buttons.

8. The electronic scale as claimed in claim 1, wherein the switch or program part is deactivated in response to a predetermined signal from the higher-level electronic data processing system via the digital interface.

9. The electronic scale as claimed in claim 1, wherein:
   the digital interface is configured to output the weighing result to the higher-level electronic data processing system, and
   the switch or program part additionally enables and locks output of the weighing result via the digital interface.

10. The electronic scale as claimed in claim 1, wherein:
    the digital interface further comprises a timer that controls the switch or program part to enable the display of the weighing result for a given time after the higher-level electronic data processing system has ceased to communicate with the scale; and
    the switch or program part disables the display following expiration of the given time.

11. A method for displaying a weighing result of an electronic scale on a display unit, comprising:
    in a power-on mode of the scale, enabling display of the result on a display unit of the scale when a higher-level electronic data processing system external to the scale is in communication with the scale, and
    in the power-on mode of the scale, disabling the display of the result on the display unit when the higher-level electronic data processing system is not in communication with the scale.

12. The method according to claim 11, further comprising:
    in the power-on mode of the scale, enabling the display of the result during a given time after the higher-level electronic data processing system is no longer in communication with the scale.

13. The method according to claim 11, further comprising:
    in the power-on mode of the scale, displaying a symbol during the disabling of the display of the result.

14. An electronic scale, comprising:
    a weighing system configured to output a weight signal;
    a processing unit configured to output a weighing result in accordance with the weight signal from the weighing system;
    a display for the weighing result;
    a lock that enables and disables the weighing result in accordance with a communication status between the scale and a data processing system external to the scale, wherein the lock enables the weighing result during periods when the communication status is in a first status, and wherein the lock disables the weighing result during periods when the communication status is in a second status differing from the first status; and
    an interface transferring data, including the weighing result and the communication status, between the processing unit and the data processing system.

15. The electronic scale as claimed in claim 14, wherein the first status comprises an active communication link between the scale and the data processing system, and the second status comprises a severed link in the communication.

16. The electronic scale as claimed in claim 14, further comprising a timer that controls the lock to enable the weighing result during a timer period when the communication status is in the second status.

17. The method according to claim 11, further comprising displaying a lock symbol on the display unit when the display of the result is disabled.

18. The electronic scale as claimed in claim 14, wherein the display displays a lock symbol when the weighing result is disabled.

* * * * *